E. B. STUART.
VEHICLE FOR GARBAGE.
APPLICATION FILED MAY 1, 1916.
1,258,377.
Patented Mar. 5, 1918.
3 SHEETS—SHEET 1.
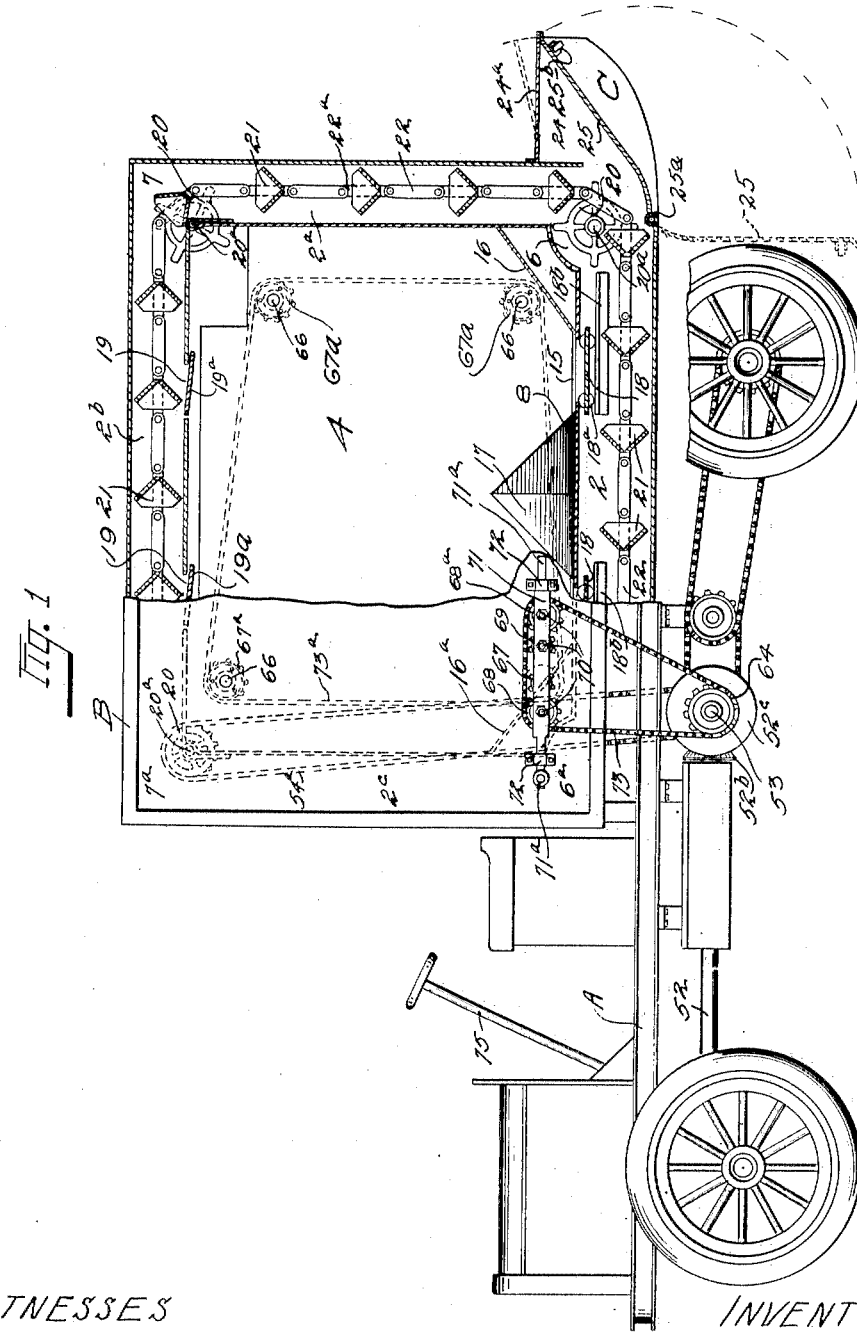
WITNESSES
Otto Melchior
Paul A. Nieren
INVENTOR
Edwards B. Stuart,
BY Rummler & Rummler
ATTYS.

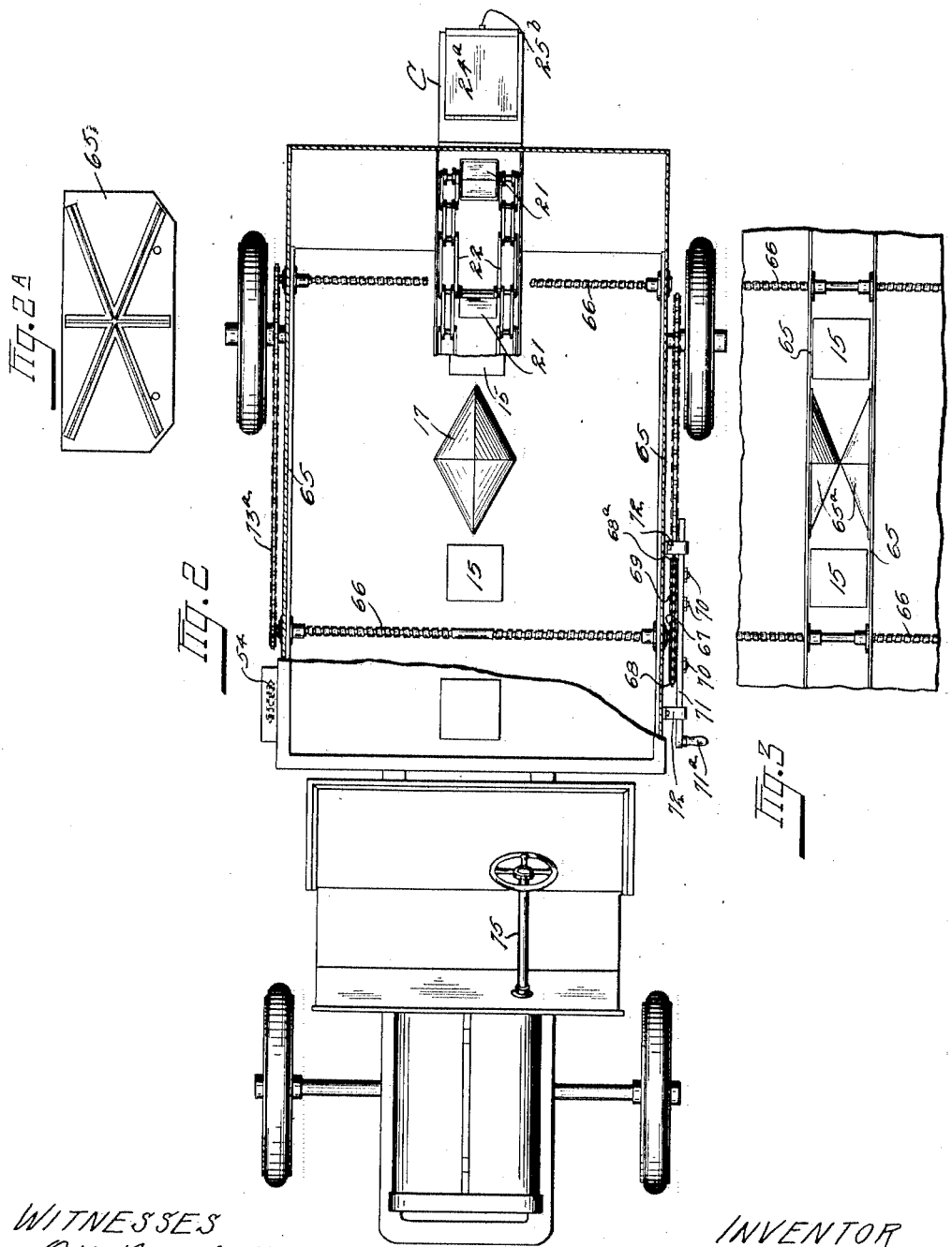

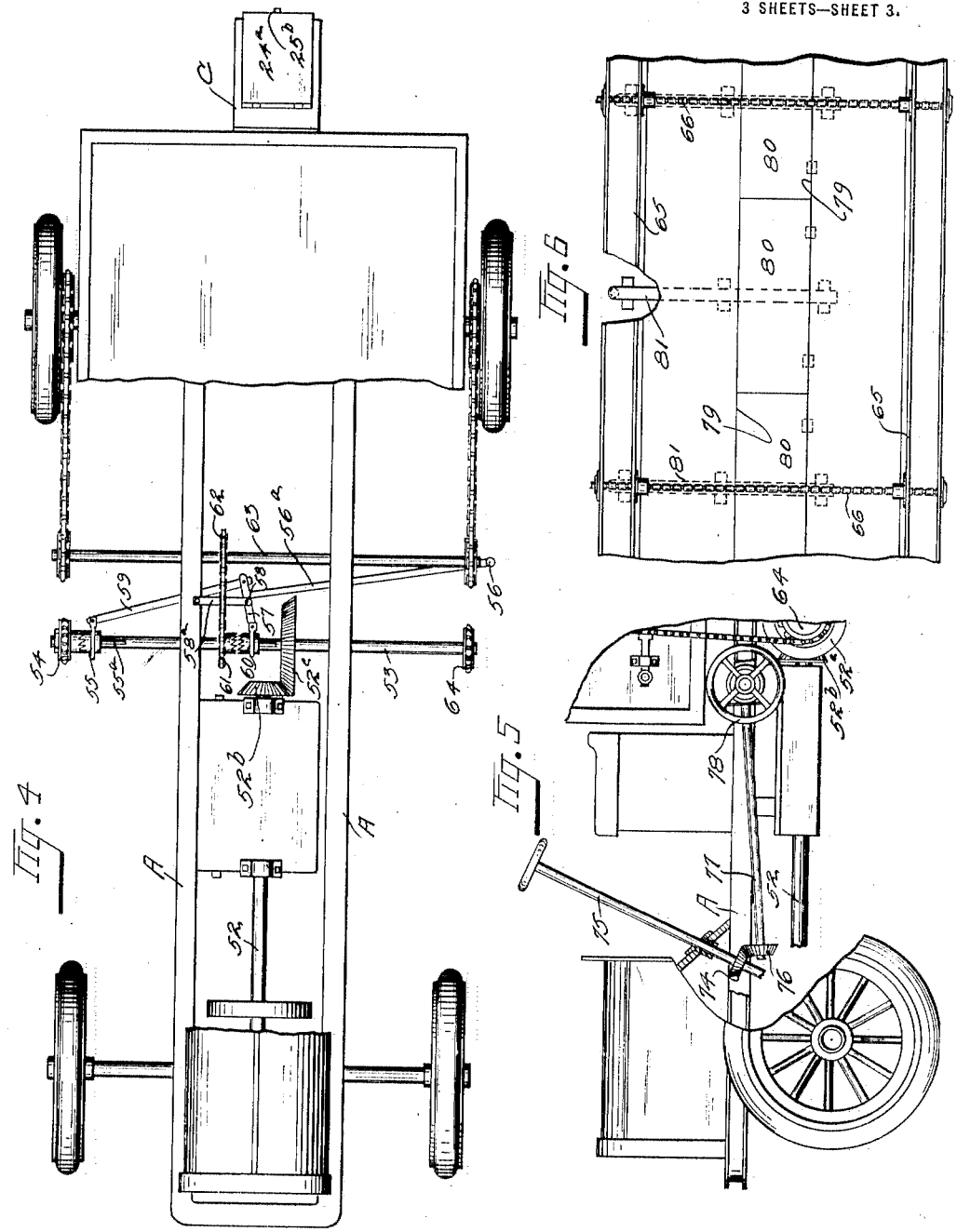

UNITED STATES PATENT OFFICE.

EDWARDS B. STUART, OF CHICAGO, ILLINOIS.

VEHICLE FOR GARBAGE.

1,258,377.     Specification of Letters Patent.     Patented Mar. 5, 1918.

Application filed May 1, 1916. Serial No. 94,689.

*To all whom it may concern:*

Be it known that I, EDWARDS B. STUART, a citizen of the United States of America, and a resident of Chicago, county of Cook, and State of Illinois, have invented certain new and useful Improvements in Vehicles for Garbage, of which the following is a specification.

This invention is related to the one covered by my application Serial No. 830,575, filed April 9, 1914, vehicles for waste material. The vehicles referred to in that application are intended especially for conveying waste material from local gathering stations to the central stations for the reduction, incineration, or other methods of rendering innocuous and possibly useful the garbage of a municipality.

The present invention aims to supply a suitable vehicle for gathering the waste material from each residence, for rapidly receiving the successive charges, and unloading the cargo expeditiously into receptacles of local gathering stations or directly into vehicles such as those forming the subject of my above mentioned, correlated application, all these operations being performed with a minimum attainable exposure of the waste material to the atmosphere.

A special object of the present invention is to provide means for positively pushing the cargo toward the discharge openings after it has ceased to run by gravity. The particular advantage of this innovation is the great gain in storage capacity of the vehicle, as compared to the vehicle forming the subject matter of the said correlated application Serial No. 830,575, in which a very material percentage of the volume included between the sides, bottom, and cover of the vehicle is occupied by sloping floors and similar devices for causing the contents to run by gravity toward the discharge openings.

In the present arrangement the floor of the improved vehicle has preferably a horizontal, unbroken surface, excepting in the portion directly over the lower branch of the discharging conveyer, where small inclined surfaces are provided over the portions between each pair of discharging gates, and it would be possible to dispense even with these comparatively inconsiderable departures from the uniformly horizontal floor, by providing plow-like deflecting or distributing surfaces in those portions of the means for positively pushing the cargo, which correspond to said spaces between the discharge openings.

Another object of the present invention is to arrange the vehicle so that the power normally used for its propulsion may also be adapted to drive the conveyer and the cargo-pushing means, which latter will hereinafter be called the scrapers.

A further object is the provision of means for governing the direction of travel of the vehicle without mounting thereon, so that the garbage collector may operate the steering mechanism from the side of the vehicle from which the means for controlling the conveying and scraper mechanisms protrude.

Furthermore, the present invention discloses an appliance whereby the material may be discharged directly from the lower branch of the conveyer without being hoisted to the upper branch as in the before mentioned correlated invention.

These objects are obtained by the construction and mechanism illustrated in the accompanying drawings in which:

Figure 1 is a side elevation of an auto truck incorporating the present invention, in which the external side wall covering the rear part of the vehicle is broken away to show the internal arrangement of the parts.

Fig. 2 is a plan view of the improved auto truck in which the rear portion of the roof and a part of the cover of the lower conveying trunk have been removed.

Fig. 2* is a side elevation on a reduced scale of one of the scraper blades, showing the details of the stiffening means.

Fig. 3 is a plan view of a portion of the conveying trunk and of the scrapers, illustrating a modified form in which the floor of the vehicle is horizontal throughout.

Fig. 4 is a plan view of the frame of the vehicle, showing the details of the mechanism for driving the truck, the conveyer, and the scrapers.

Fig. 5 is a side elevation of a portion of the truck illustrating a means for steering the vehicle from the ground.

Fig. 6 is a detail of the rear end of the car.

The reference letters of application Serial No. 830,575 have been retained wherever possible in designating the parts of the drawings accompanying the present application. A box-shaped body mounted on the frame A of an auto truck is provided with a trunk 2, 2ª, 2ᵇ, 2ᶜ, extending longitudinally and centrally around the cargo space 4, its upper branch 2ᵇ being disposed immediately beneath the roof B of the body of the car, while its lower branch 2 is disposed under the floor 8. At its rear end trunk 2 is developed into a boot 6 from the upper end of which a vertical branch 2ª of the trunk, of the same cross section as that of the bottom branch 2, rises to the turn or elbow 7, from the forward end of which extends horizontally the upper branch 2ᵇ of the trunk to an elbow 7ª (shown dotted), leading to the vertical return branch 2ᶜ of the trunk, which connects with the forward end of the lower branch 2 by the lower elbow or boot 6ª. Openings 15, suitably spaced apart in a longitudinal direction, are cut in the ceiling or upper wall of the lower branch 2 of the trunk. At the rear and forward ends of space 4, the floor 8 slopes upward from the inclined portions 16, 16ª a part of which forms the upper and inner wall of the boot provided at each end of the trunk 2.

Between adjacent openings 15 the floor is given the shape of one-half of an octohedron 17, extending longitudinally between said adjacent openings 15, and transversely for the width of the trunk 2. The purpose of this diamond-shaped figure is to cause loose material lying above it and confined transversely between the two scraper plates, that will hereinafter be described, to run by gravity to the openings 15. Each of the openings 15 is controlled by a horizontal gate 18 supported by rollers 18ª running on suitable angle iron tracks 18ᵇ.

Directly above each opening 15, an opening 19 is cut in the wall of the upper branch 2ᵇ of the trunk. Each of these openings 19 is controlled by a gate 19ª at a slight inclination to the horizontal (Fig. 1) and operated by a suitable mechanism of known construction. At each elbow 7, 7ª, and each boot 6, 6ª of the trunk a pair of sprocket wheels 20 are mounted on shafts 20ª journaled in suitable bearings provided in the side walls of the trunk. Between each pair of these sprocket wheels passes a bucket conveyer consisting of a number of buckets 21 of triangular, vertical, longitudinal section, each flat, vertical side of which is rigidly secured to a link 22ª of a chain 22, which is engaged by the sprocket wheels (Figs. 1 and 2). The details of the construction of the conveyer are fully disclosed in the text and drawings of my application, Serial No. 830,575, and as no part or feature of the conveyer is claimed in the present application, they are not here set forth with more particularity.

The conveyer is preferably driven by the pair of sprocket wheels 20 mounted on shaft 20ª at the upper elbow 7ª on the following side of the conveyer, which is the side toward which the latter moves after having discharged its loaded buckets. The line shaft 52 of the auto-truck motor drives by means of bevel gears 52ᵇ and 52ᶜ, the transverse shaft 53 from which all the mechanisms of my improved vehicle for garbage derive their power.

A sprocket wheel 54 (Fig. 4) which normally runs idle on shaft 53 drives said shaft 20ª by means of a sprocket chain 54ª, when thrown into operative connection with the main power shaft 53 by means of a clutch coupling 55 which rides on a feather 55ª projecting from shaft 53, and is thrown into and out of connection with the hub of sprocket wheel 54 by a controlling lever 56 which projects from the operating side of the truck, and is connected with the clutch by a link system of known construction.

In this link system the controlling link 56ª is provided with a transverse head or member 57 pivoted near the middle of its length to a pin 58 mounted on a bracket 58ª projecting inwardly from the side bar of frame A of the truck. One end of member 57 is pivotally joined to connecting rod 59, while its other end is pivoted to a strap on a clutch coupling 60 riding on a feather embedded in shaft 53 and adapted to engage the toothed edge of the hub of a sprocket wheel 61, which transmits by sprocket chain 62 the power of the driving shaft 63 to the rear wheels of the truck, through known connections of the sprocket gearing and chains.

When the controlling lever 56 is moved so as to put sprocket wheel 54 of the conveyer mechanism into operative connection with shaft 53 the link 57 draws clutch 60 out of connection with the hub of sprocket wheel 61, so that the power can no longer be used to propel the vehicle. The movement of disconnecting sprocket wheel 54 from clutch 55 simultaneously throws clutch 60 into mesh with the hub of sprocket wheel 61, whereby operative connection between the motor and the driving wheels of the car is reëstablished.

It will be observed in this connection, that a sprocket wheel 64 which is fast on shaft 53 is always in operative connection with the motor shaft 52. A short, box-shaped extension C projects centrally from the rear end of the car in prolongation of the lower branch 2 of the conveyer trunk. A hatch 24 provided in the top of extension C, and normally closed by a cover 24ª, has sloping down from it the flaring sides 25 of a conduit or chute leading into the rear part of the boot 6.

The garbage collected in cans at the various residences and other inhabited places, is dumped through hatch 24 into this chute. To obtain the best results from the application of this invention, the shape and size of the hatch 24 should conform to the outside dimensions and shape of the mouth of the garbage cans, so that in dumping the escape of solid particles of the waste material is entirely eliminated and the contamination of the atmosphere by the escape of foul gases or smells is reduced to a minimum.

The gates 18 of all the openings 15 in the lower trunk are closed when garbage is being loaded, and the gates 19$^a$ of the openings 19 in the upper trunk are all open, and the conveyer set into operation as the waste material commences to flow into and gather in the bottom of the boot 6. Each bucket is automatically loaded by being pulled with its open mouth in advance through the accumulation of material in the boot, the buckets discharge their contents automatically through the openings 19 in the upper trunk into the cargo space 4.

To discharge the cargo the gates 19$^a$ of the upper branch 2$^b$ are closed and the gates 18 of the lower branch 2 are opened and the material falling through openings 15 into trunk 2 is picked up by buckets 21 of the conveyer and carried up to the branch 2$^b$.

For the special purposes of this garbage-collecting vehicle the preferred method of discharging the cargo is to lower the apron 25 which forms the rear part of the inlet chute and is hinged at 25$^a$ to the rear end of the bottom wall of the lower branch 2 of the conveyer trunk, the upper end of said apron being normally held in place by a latch 25$^b$. The apron 25 may be swung down until its lower edge rests on the edge of a suitable receptacle, into which the cargo will then flow by gravity after having been discharged onto the upper and forward part of the apron by the buckets 21 before they make the turn to rise in branch 2$^a$ of the conveyer trunk.

At each side of the vehicle an internal, vertical scraper plate 65, extending from the floor to a short distance below the roof and the whole length of the cargo space, is mounted on four transverse shafts 66, having a right-handed thread on one side of the car and a left-handed thread on the opposite side.

A sprocket wheel 67 is mounted on the left-hand end of the lower forward one of the threaded transverse shafts 66. This is caused to rotate in one direction by being put in mesh with a sprocket wheel 68, and in the reverse direction by engagement with the sprocket wheel 69, these two sprocket wheels being rotatably mounted on studs 70 projecting inwardly from a reversing bar 71, adapted to slide in brackets 72—72 secured to the side of the truck body, and provided with an operating handle 71$^a$. The sprocket wheel 68 receives its motion from the main power-distributing shaft 53 through sprocket wheel 64 by means of a sprocket chain 73 which is led over wheels 64, 68 and the idler 68$^a$.

On the right-hand side of the truck a sprocket chain 73$^a$ (shown in dotted lines in Fig. 1,) engages sprocket wheels 67$^a$ mounted on the end of each of the four threaded shafts 66. It will be seen that the two scraper plates will thus be moved simultaneously toward and away from the central trunk 2 according to the position of the shifting bar 71. Sufficient clearance is allowed between wheels 67 and 69 to enable both to be moved out of mesh with both of the sprocket wheels 68 and 69, so that when the scraper plates are not being moved toward the center to discharge the cargo, nor toward the sides to enable the truck body to be filled the rotation of shaft 53 will not be communicated to the transverse shafts 66.

In the modification illustrated in Fig. 3 the diamond-shaped raised portion 17 of the previous construction is dispensed with, the floor of the cargo space being level and unbroken. At the middle and lower part of each of the scraper plates 65 a plow-shaped, integral distributer 65$^a$ projects toward the trunk 2. When the points of these two plows have been brought together, as shown in Fig. 3, practically all of the waste material remaining caught between the two scraper plates runs off by gravity to the openings or hatches 15—15.

To enable the driver to operate the elevating and scraping mechanisms without mounting his seat on the truck, and yet direct the very slowly moving vehicle, a special bevel wheel 74 (Fig. 5) is connected to the steering post 75 near its lower end and is moved by a bevel wheel 76, mounted on a longitudinal auxiliary shaft 77, connected by bevel gear to the auxiliary steering wheel 78.

I do not limit myself to the conveying means above described for use in the present invention. As regards its main feature, viz., the cargo-pushing scrapers, this may eventually be used in connection with the screw conveyer and the beaded-flight conveyer of my aforesaid application, Serial No. 830,575, as well as any other form of conveyer.

Again, if no central conveyer be used at all and the cargo be discharged through openings provided along the middle of the floor with suitable closing and opening means, the scrapers are available for insuring complete discharge of the cargo.

In the modification illustrated in Fig. 6, the truck body is built without any discharge trunk, having simply a long central, longitudinal slot 79, closed normally by any suitable door that can be opened from outside the body. The preferred form would be a door such as shown at 80, hinged to the bottom of the truck and held closed by long bolts 81 extending underneath the bottom to the side of the truck body. In this case the floor requires no raised portions such as the octohedron 17, nor the scrapers, plow-shaped projections such as 65ª. When the cargo has ceased running by gravity in discharging, the scrapers are set in motion and continue to approach each other until, if need be, they are brought face to face.

Although but one specific embodiment of this invention has been herein shown and described it will be understood that the construction may be altered and details omitted without departing from the spirit of this invention, as defined by the following claim.

I claim:

A vehicle body, having a central longitudinal trunk extending around the inside of said body excepting at the bottom where it is beneath the floor of said body, mechanical conveying means within said trunk, and means for closing and opening the discharging end of the lower branch of said trunk and for guiding cargo discharged from said lower branch to any desired point of deposit.

Signed at Chicago this 3d day of April 1916.

EDWARDS B. STUART.